Oct. 6, 1925.
J. W. WILKINSON
CONVERTIBLE LAWN AND HEDGE SHEARS
Filed June 15, 1922
1,556,188
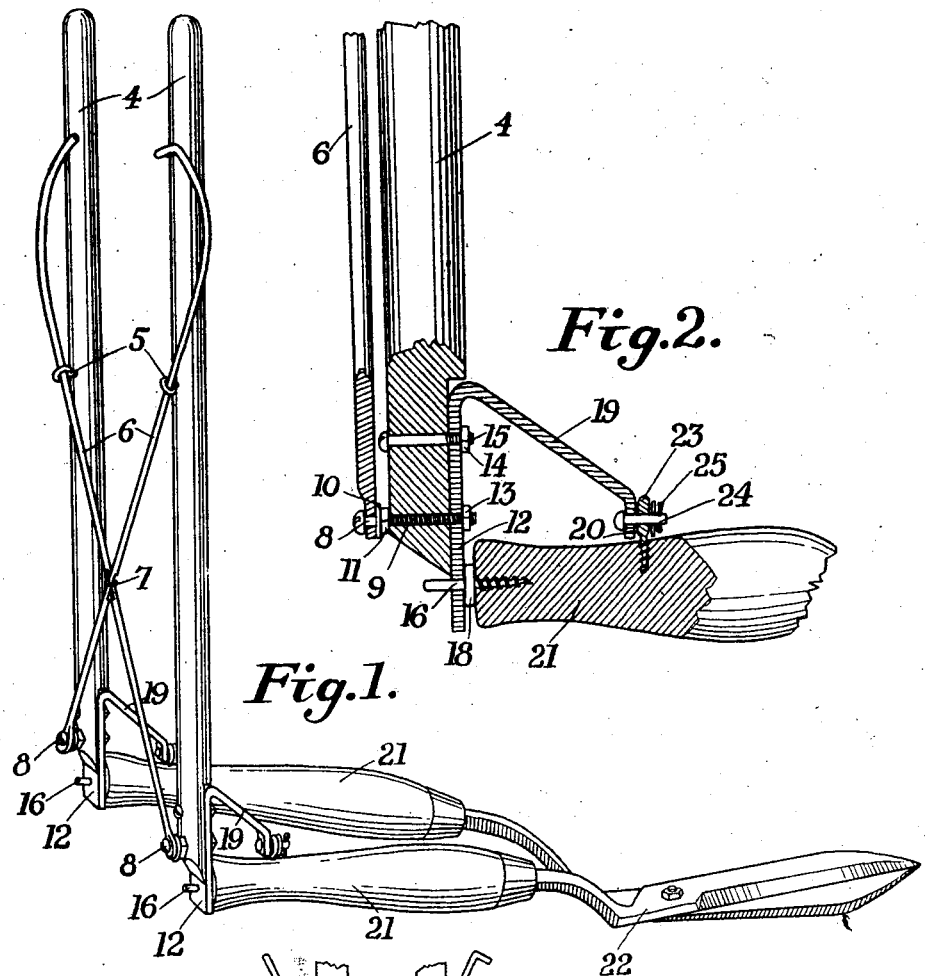
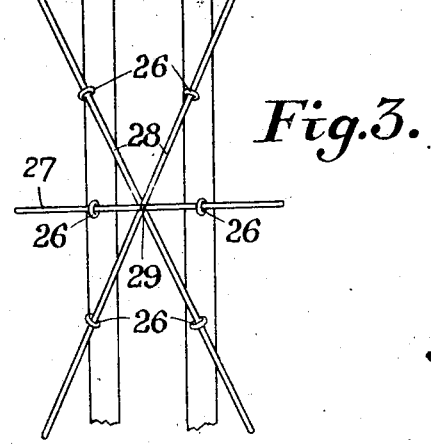
WITNESS:
Rob<sup>t</sup> R. Kitchel
INVENTOR
J. Walter Wilkinson
BY
ATTORNEY Patented Oct. 6, 1925.

1,556,188

UNITED STATES PATENT OFFICE.

J. WALTER WILKINSON, OF PHILADELPHIA, PENNSYLVANIA.

CONVERTIBLE LAWN AND HEDGE SHEARS.

Application filed June 15, 1922. Serial No. 568,386.

*To all whom it may concern:*

Be it known that I, J. WALTER WILKINSON, of Philadelphia, Pennsylvania, a citizen of the United States, have invented certain new and useful Improvements in Convertible Lawn and Hedge Shears, of which the following is a specification.

This invention relates to lawn trimming and mowing implements and more particularly to means for operating cutters such as hedge or pruning shears, when used in cutting close to the ground, or to cut around bushes, shrubbery, trees, etc., and along sidewalks or near fences, walls and other places.

The principal object of my invention is to provide an implement which could be quickly connected to a pair of shears such as hedge shears for cutting or trimming close to the ground without stooping.

Another object is a device, including a pair of handle bars, adapted for connection at an angle with shears to operate the same to cut close to the ground without stooping, and without bending or otherwise interfering with the proper registration of the cutting edges.

With the above and related objects in view, this invention comprises the construction, combination and arrangement of parts hereinafter more fully described, an embodiment whereof is illustrated in the accompanying drawing, and embraced within the scope of the appended claims, it being understood that the essential and characteristic features may be modified without departing from the spirit or sacrificing any of the advantages thereof.

In the said drawing:

Fig. 1 is a perspective view of a hedge cutting shears provided with my operating device.

Fig. 2 is a fragmentary view showing in detail the manner of joining the various elements thereof.

Fig. 3 is a fragmentary view of a modified form of my invention.

Referring more particularly to the drawing for a detail description of my invention, the operating device comprises a pair of handle bars 4 having mounted thereon in alignment screws provided with eyes 5 for rods 6. The rods are cross-connected to swing on a rivet 7 and the corresponding ends of the rods below the rivet are perforated for bolts 8 on which the rods are free to swing. The bolts 8 are adapted to connect the rods with the handle bars, each bar being provided with a threaded hole for the threaded portion 9 of the bolt. Each bolt carries a washer 10, and a nut 11, between the rod and bar. A bracket 12 is clamped onto the bar opposite its rod by a nut 13, mounted upon the bolt 8, and by a nut 14 of a bolt 15. Each bracket is extended beyond the end of its bar where it is perforated for the pin portion of a bolt 16, having a threaded portion opposite the pin portion and a flange 18 between said portions. Each bracket 12 has an extension 19 provided with a perforation at its end 20.

The hereinbefore described operating device is adapted for connection with the handles 21 of shears 22 by means of the threaded portion of the bolt 16, and by an eye bolt 23. A bolt 24 is passed through the perforation of the end 20, of the bracket and the eye of the bolt 23, the bolt 24 being provided with a perforation for a pin 25. To operate the shears by means of the handle bars, the bars are moved away from each other to open the shears and towards each other to close the shears. When the bars are moved in a direction away from each other, the rods 6 swing and slip or slide along the eyes 5, thus lengthening the leverage above the point of crossing, causing the bars to swing with their brackets, upon the pin portions of the bolts 16 and upon the bolts 24, the extension 19 preventing the relative angular displacement between the handle bars and shears.

As shown in Fig. 1 the upper ends of the rods 6 are close to the bars 4, and the portion of the rods above the eyes 5 are curved in such a manner that when the bars 4 are moved apart the said upper ends of the rods move vertically in alinement with the bars.

When the shears are used to trim hedges, or to trim the edge of a lawn close to an embankment, the handle bars may be quickly disconnected from the shears by removing the bolts 24.

What I claim is:

1. The combination with shears, a pair of handle bars mounted parallel to each other in a vertical plane and adapted to move bodily toward and from each other in said plane to operate the shears, and means guiding the bars to move in said plane.

2. The combination claimed in claim 1, and means movably connecting the bars with the guiding means.

3. The combination with shears, a pair of handle bars mounted parallel to each other in a vertical plane and adapted to move bodily toward and from each other in said plane to operate the shears, and means to limit the distance through which the bars may be moved.

4. The combination claimed in claim 3, said limiting means comprising a pair of crossed rods, each rod movably connected at one end with one of the bars and at its opposite end with a second bar.

5. The combination with shears, a pair of handle bars operatively connected with the shears, a pair of crossed rods movably connected with the bars, and a fulcrum common to said rods.

6. The combination claimed in claim 5, and means to cause said fulcrum to move in a plane parallel with that of the bars.

7. The combination with shears, a pair of handle bars to operate the shears, a pair of crossed rods between the bars, and means fixedly mounted on the bars connecting the opposite ends of each rod to said bars.

8. The combination claimed in claim 7, and means to cause said rods to slide during the operation of the bars.

9. The combination with shears, a pair of handle bars to operate the shears, a pair of crossed rods, means slidingly connecting the rods with the bars, and a fulcrum common to said rods.

10. The combination claimed in claim 9, said fulcrum being intermediate the connecting means.

11. The combination with shears, a parallel pair of handle bars operatively connected with the shears, and movable bodily toward and away from each other in a plane at an angle with that of the shears, and means for guiding the bars slidingly connected with the bars.

12. The combination claimed in claim 11, said bars provided with means to cause the guiding means to rock.

13. The combination with shears, a pair of handle bars mounted parallel to each other and adapted to move bodily toward and from each other in a plane at an angle with that of the shears to operate the same, and means detachably connecting the bars at a fixed angle with the shears.

14. The combination claimed in claim 13, and braces between the bars and shears.

15. The combination with shears, a pair of handle bars to operate the shears, means connecting the bars at an angle with the shears, said means connecting each bar with shear member at two points at an angle to each other.

16. The combination claimed in claim 15, said connecting means adapted to permit of the movement of the bars in alignment with each other.

17. In combination with a pair of shears, a pair of handle bars to operate the shears and movable bodily towards and away from each other in a plane at an angle with that of the shears, means connecting the bars at a fixed angle with the shears, said connecting means adapted to permit of the movement of the bars in alignment with each other.

18. The combination claimed in claim 17, and means interconnecting the bars.

19. In combination with a pair of shears, a parallel pair of handle bars to operate the shears and movable bodily towards and away from each other in a plane at an angle with that of the shears, means connecting the bars with the shears, and means adapted to permit of a relative movement between the bars and shears.

20. The combination claimed in claim 19, including means movably interconnecting the bars.

21. In combination with a pair of shears, of a parallel pair of handle bars to operate the shears, said bars and shears being connected at a fixed angle, and means interconnecting the bars comprising a pair of rods each connected at one end with one of the bars and free to slide along the other bar.

22. The combination claimed in claim 21, each bar provided with means for guiding the rod of the adjacent bar.

23. In combination with a pair of shears, a pair of handle bars mounted parallel with each other and adapted to move bodily towards and from each other to operate the shears, means detachably connecting the bars at a fixed angle with the shears, and a pair of rods interconnecting the bars.

24. The combination claimed in claim 23, each rod being connected at one end with one of the bars and having its opposite end free to move along the other bar.

In testimony whereof I hereunto affix my signature.

J. WALTER WILKINSON.